(12) United States Patent
Kadoch et al.

(10) Patent No.: US 8,363,102 B1
(45) Date of Patent: Jan. 29, 2013

(54) DYNAMICALLY LOAD BALANCING DATE TRANSMISSION USING ONE OR MORE ACCESS POINTS

(75) Inventors: Christopher Allen Kadoch, Leesburg, VA (US); Kurt A. Kessel, Altamonte Springs, FL (US)

(73) Assignee: L-3 Communications Mobile-Vision, Inc., Boonton, NJ (US)

( * ) Notice: Subject to any disclaimer, the term of this patent is extended or adjusted under 35 U.S.C. 154(b) by 1874 days.

(21) Appl. No.: 11/581,228

(22) Filed: Oct. 13, 2006

(51) Int. Cl.
*H04N 7/18* (2006.01)

(52) U.S. Cl. ...................................................... 348/148

(58) Field of Classification Search ................... 348/143, 348/148
See application file for complete search history.

(56) References Cited

U.S. PATENT DOCUMENTS

| | | | | |
|---|---|---|---|---|
| 5,682,133 | A * | 10/1997 | Johnson et al. | 340/426.19 |
| 6,314,425 | B1 * | 11/2001 | Serbinis et al. | 1/1 |
| 6,831,556 | B1 | 12/2004 | Boykin | 340/539.1 |
| 6,889,266 | B1 * | 5/2005 | Stadler | 710/22 |
| 6,980,533 | B1 | 12/2005 | Abraham et al. | 370/329 |
| 7,673,018 | B2 * | 3/2010 | Tapuska et al. | 709/219 |
| 7,872,593 | B1 * | 1/2011 | Rauscher et al. | 340/933 |
| 8,265,018 | B2 * | 9/2012 | Zellner et al. | 370/329 |
| 2003/0035434 | A1 * | 2/2003 | Le et al. | 370/443 |
| 2003/0210672 | A1 | 11/2003 | Cromer et al. | 370/338 |
| 2004/0001467 | A1 | 1/2004 | Cromer et al. | 370/338 |
| 2004/0008255 | A1 * | 1/2004 | Lewellen | 348/148 |
| 2004/0107242 | A1 * | 6/2004 | Vert et al. | 709/203 |
| 2004/0229621 | A1 | 11/2004 | Misra | 455/445 |
| 2005/0037787 | A1 * | 2/2005 | Bachner et al. | 455/502 |
| 2005/0068175 | A1 * | 3/2005 | Faulkner et al. | 340/541 |
| 2005/0088521 | A1 * | 4/2005 | Blanco et al. | 348/148 |
| 2005/0132414 | A1 * | 6/2005 | Bentley et al. | 725/105 |
| 2006/0007870 | A1 * | 1/2006 | Roskowski et al. | 370/252 |
| 2007/0097941 | A1 * | 5/2007 | Le et al. | 370/341 |
| 2007/0219685 | A1 * | 9/2007 | Plante | 701/35 |
| 2007/0282925 | A1 * | 12/2007 | Son | 707/204 |
| 2012/0057033 | A1 * | 3/2012 | Morino | 348/207.1 |
| 2012/0110140 | A1 * | 5/2012 | Chapweske | 709/219 |

* cited by examiner

*Primary Examiner* — Douglas Blair
*Assistant Examiner* — Benjamin Ailes
(74) *Attorney, Agent, or Firm* — Mayer & Williams PC

(57) ABSTRACT

Dynamic load balancing of network traffic is achieved using one or more access points by using a server-centric approach where rules are applied to attributes and characteristics observed by the server which form a profile of wireless clients accessing the network, such as in-car video systems. In various illustrative examples, priorities are assigned to in-car video systems and data files stored therein to which the server applies rules to responsively invoke commands performed by the in-car video systems to balance the uploading of data files to the server. The commands, when executed, allow high priority data files, or data files from high priority in-car video systems or users to be uploaded first, while lower priority data files or users are put on hold. In other illustrative examples, in-car video systems are commanded by the server or forced to roam between access points having overlapping coverage but operating on different non-interfering channels.

35 Claims, 8 Drawing Sheets

DYNAMICALLY LOAD BALANCING DATE TRANSMISSION USING ONE OR MORE ACCESS POINTS

TECHNICAL FIELD

This invention is related generally to data transmission from a client to a server, and more particularly to dynamic load balancing the transmission of data using one or more access points.

BACKGROUND

Vehicle-mounted surveillance systems, also termed in-car video systems, are seeing increased use in the security industry and law enforcement community as an effective means to provide an indisputable video and audio record of encounters involving officers and citizens. In these systems, a video camera is typically mounted on the police car's dashboard or windshield and is generally arranged to have a field of view of the area to the immediate front of the car. The field of view approximately corresponds to what an officer would see when seated in the car's front seat. The video camera is operatively coupled to a recording device, such as digital DVR, mounted in the police car.

In-car video systems generally employ a wireless microphone carried on the person of a law enforcement officer to record an audio soundtrack that accompanies the visual scene captured on the video recording. The audio soundtrack is an extremely valuable complement to the recorded video because it acts as a transcript of what was said, by whom and when. In some cases, the audio soundtrack is more valuable as evidence than the visual record because issues pertaining to consent, admissions, and state-of-mind of the suspect and/or officer (to cite just a few examples) may be resolved more effectively by the audio record. In some systems, additional wired microphones may be deployed in other locations within the car, such as the rear-seat passenger area, to record sounds and conversations emanating from those locations.

A video recording may be started manually by the officer, or in some systems, the video recording is started automatically when, for example, the officer activates the police car's emergency systems (such as overhead lights and/or sirens), vehicle doors are opened, the police car exceeds a threshold speed (as in the case of a pursuit) or when a vehicle speed-measuring radar unit is operated. The incident is recorded on video until the system is either manually or automatically switched off.

In-car video systems serve to enhance prosecution of traffic, DWI/DUI, and controlled dangerous substances offenses (to name just a few) by contributing detailed graphical and auditory evidence in a time-sequential manner that is inherently unbiased and objective. Such evidence is a valuable adjunct to eyewitness and officer testimony. In addition, as with other quality-improvement initiatives where conduct is surveyed and recorded, in-car video system usage has been shown to assist in the maintenance of high professional standards among law enforcement personnel. Police-community relations have improved and citizen complaints of police misconduct have lessened in many jurisdictions where in-car video systems are used, often as a result of the inherently high-quality evidence provided by such systems. Videos taken with in-car video systems are also valuable training aids to law enforcement personnel. As a result, in car video systems are widely deployed in the United States. Typically every patrol car in a police agency is equipped with an in-car video system.

In-car video systems often communicate with a remotely located server using the popular Institute of Electrical and Electronics Engineers ("IEEE") 802.11 wireless communication standard which specifies the use of a shared transmission medium between a wireless access point and wireless clients disposed in respective in-car video systems that need to access the network. While wireless communication and uploading of captured video to the remote server generally performs satisfactorily, a given access point can only be receiving data from one wireless client at a time. In addition, a wireless client that requests bandwidth may often be granted a disproportionate amount of bandwidth which may result in that client monopolizing the transmission channel that operates on the access point. This potential for monopolization, along with the typically bursty nature of digital transmission, and limitations imposed by the physical installation of the wireless such as interference from other RF (radio frequency) sources, may often result in less than desired throughput from the wireless clients to the access point. Lengthy times for uploading data from the wireless clients through the access point to other devices coupled to the network such as servers and storage devices may also be experienced.

Accordingly, more efficient data transmission over wireless networks is desired.

SUMMARY

Load balancing of network traffic is achieved using one or more access points by employing a server-centric approach where rules are applied to attributes and characteristics observed by the server which form a profile of wireless clients accessing the network, such as in-car video systems. In various illustrative examples, priorities are assigned to in-car video systems and data files stored therein to which the server applies rules to responsively invoke commands performed by the in-car video systems to balance the uploading of data files to the server. The commands, when executed, allow high priority data files, or data files from high priority in-car video systems or users to be uploaded first, while lower priority data files or users are put on hold. In other illustrative examples, in-car video systems are commanded by the server to switch or are forced to roam between access points having overlapping coverage but operating on different non-interfering channels. The load balancing is performed dynamically so that the rules are applied to in-car video systems as they enter and leave the network over time.

The present load balancing arrangement enables efficient utilization of available bandwidth and network resources while ensuring that high priority data is uploaded first to the server to thereby enhance security and reliability of the data.

DETAILED DESCRIPTION

Digital evidence or electronic evidence is any probative information stored or transmitted in digital form that a party to a court case may use at trial. The use of digital evidence has increased in the past few decades as courts have allowed, for example, the use of e-mails, digital photographs, ATM transaction logs, word processing documents, instant message histories, files saved from accounting programs, spreadsheets, internet browser histories, databases, the contents of computer memory, computer back-ups, computer printouts, Global Positioning System ("GPS") tracks, logs from a hotel's electronic door locks, and digital video or audio files.

In particular, the adoption of digital in-car video systems, such as those used in police cars, has created a large volume of digital video and associated digital audio (generally collectively referred to as "video" unless otherwise specifically noted) that needs to be managed in a cost-effective manner. Video captured in police cars needs to be saved and/or archived for potential use in subsequent investigations or legal proceedings such as trial, but typically only a very small portion of the collected video ends up having evidentiary value. And, as it is generally not possible to know in advance which video will have future value, all of the captured and stored video must be treated as potential evidence.

Figure 1:
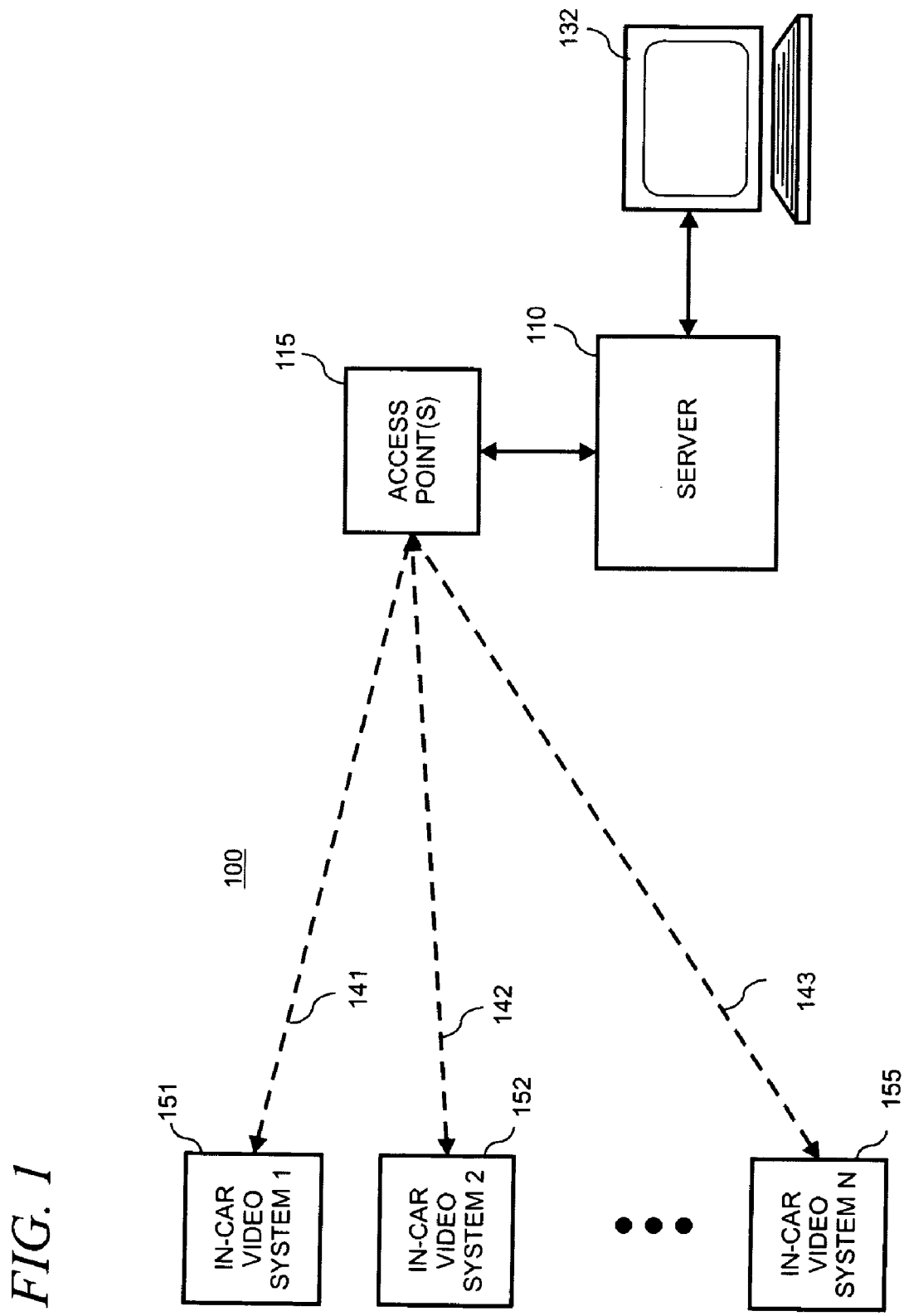
FIG. 1 shows an illustrative dynamic load balancing network architecture.

Referring now to the FIGs where like numerals indicate like components, FIG. 1 shows an illustrative dynamic load balancing network 100. A server 110 is arranged to receive digital video and audio files from a plurality of client in-car video systems 1, 2 . . . N (which are represented by reference numerals 151, 152 and 155 in FIG. 1) which are typically deployed in police cars in the field. These in-car video systems may typically be configured as digital video systems which capture video, associated audio, and other data from incidents or other events of potential interest which are then stored locally in digital format using a digital video recorder ("DVR") equipped with a hard disk drive or other digital storage media such as flash RAM (random access memory). All such captured data has potential evidentiary value as discussed above.

As shown, server 110 is coupled to a wireless access point 115. More than one access point may be utilized (not shown in FIG. 1) and multiple access points may be placed in a distributed configuration to increase the footprint of the network 100 depending on the number of wireless connections that need to be supported in a particular application as well as load balancing factors as discussed below. Typically, three to five in-car systems may be supported by each access point using conventional protocols such as IEEE 802.11 wireless networking standard promulgated by the Institute of Electrical and Electronic Engineers whereby bandwidths of 8 to 16 Mbps may be typically realized. More recent and emerging standards are expected to increase these bandwidths significantly. In most applications, wireless encryption protocol ("WEP"), for example, using 128 bit encryption between network elements is used to ensure network security.

The wireless access point 115 establishes wireless links, indicated by the dashed lines 141, 142 and 143 in FIG. 1, to the in-car video systems. Data files representing captured video and audio are uploaded from the in-car video systems via the wireless links and wireless access point 115 to the server 110.

Server 110 and wireless access point 115 are arranged for bi-directional communication with the clients. That is, digital data files can be uploaded from the in-car video systems 151, 152 and 155 to server 110, and server 110 can send commands and instructions, among other data to the in-car video systems 151, 152 and 155.

An administrator interface 132 is coupled to the server 110 as shown in FIG. 1. Interface 132 supports an application, which in this illustrative example is a web-browser based application, to present a number of screens to the administrator which are used to provide menu selections and accept user input, typically using a graphical user interface with conventional buttons, pull down menus and the like. Using the interface 132, the administrator may select and configure certain configurable options regarding the application of rules and policies that govern how data uploading from the in-car video systems 151, 152 and 155 is balanced.

Figure 2:
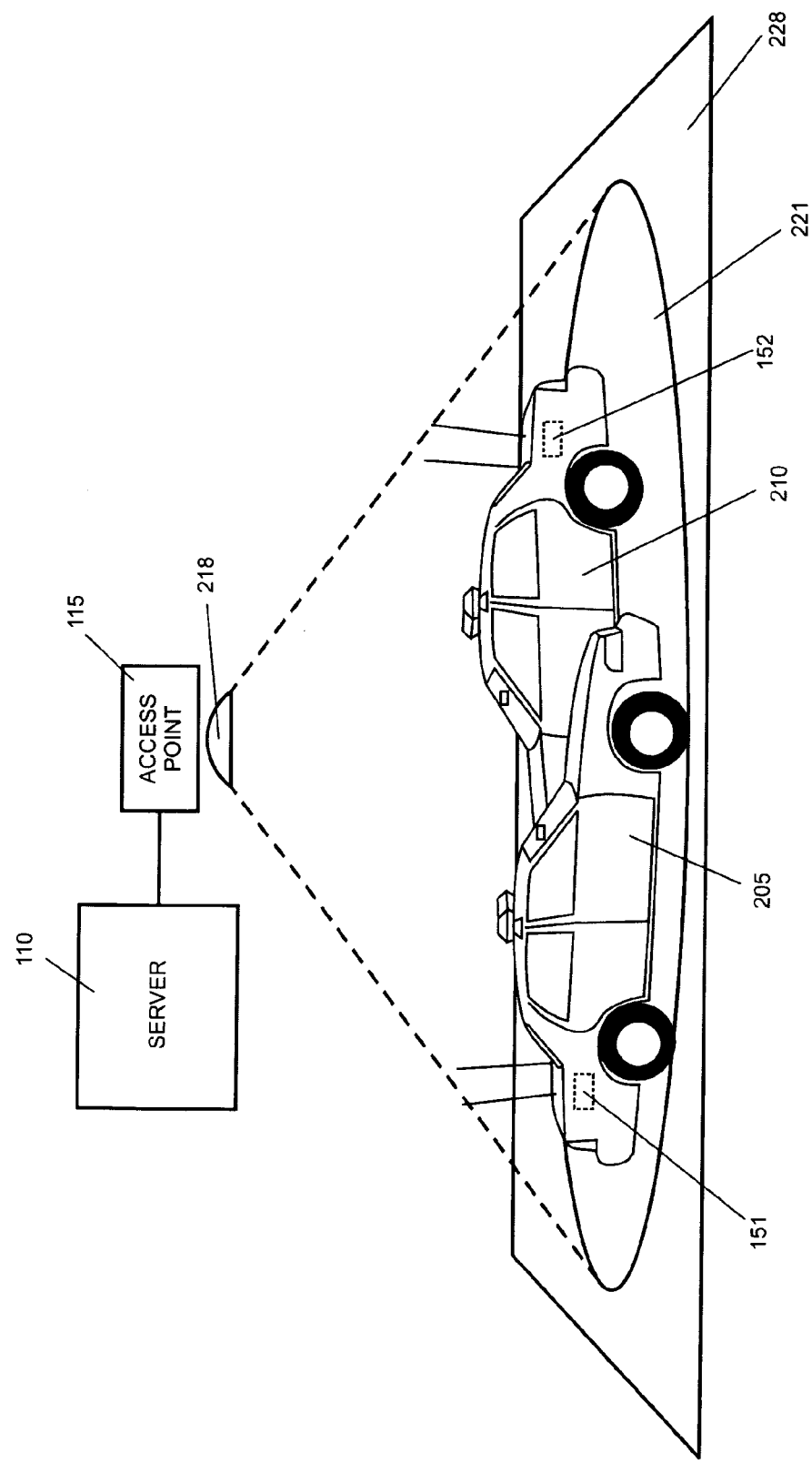
FIG. 2 is a pictorial view of an illustrative arrangement in which two in-car video systems disposed in police cars access a single access point.

FIG. 2 is a pictorial view of an illustrative arrangement in which two in-car video systems 151 and 152 are disposed, respectively, in police cars 205 and 210. In this illustrative example, in-car video systems wirelessly communicate with a single access point 115 that is coupled to server 110. Access point 115 is configured with an antenna 218 that is arranged to project a zone of coverage 221 in a deployment area 228, which in this example, could be a police car parking lot adjacent to a police agency building. In normal operation, as in-car video equipped police cars come into range of the wireless network access point 115 by driving into the parking lot, a wireless transaction is set up between the in-car video system, for example in-car video system 151, and the server 110 that is coupled to the access point 115. Server 110 in commonly set up inside the police agency building.

Figure 3:
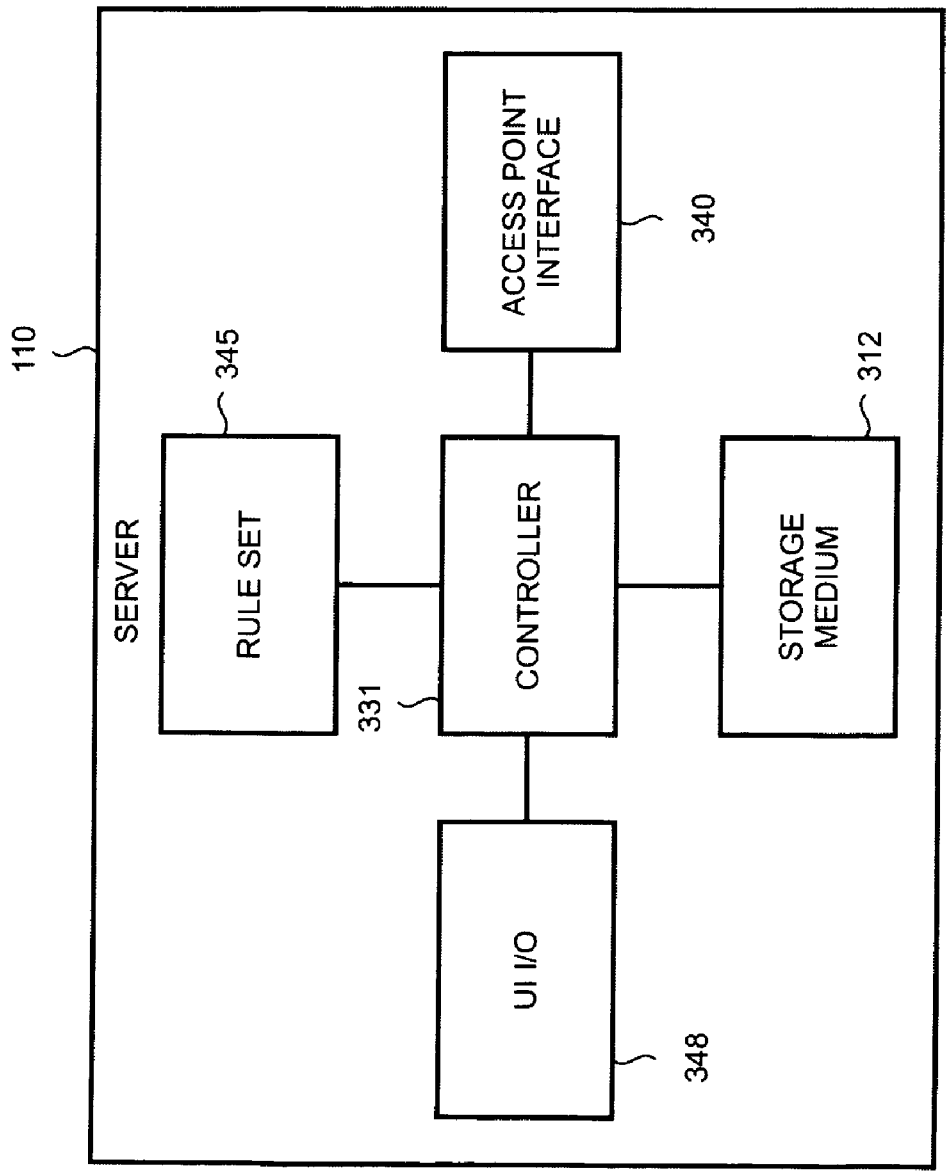
FIG. 3 is a block diagram showing details of an illustrative server.

As shown in FIG. 3, server 110 includes a storage medium 312 such as a hard HDD or redundant array of independent disks ("RAID") which is a system of multiple HDDs for replicating data across the HDDs for increased data integrity. Storage medium 312 is used to store data downloaded from the in-car video systems (e.g., in-car video system 151 and 152 in FIG. 2) under control of a controller 331. The downloaded data is received over a wireless access point interface 340 that is coupled to a wireless access point (e.g., wireless access point 115 in FIGS. 1 and 2). The Ethernet communications protocol, for example, is employed between interface 340 and wireless access point 115.

The controller 331 is coupled to a rule set 345. Rule set 345 includes one or more rules (i.e., policies) that govern the generation of load balancing commands from controller 331 that are sent over the interface 340 to access point 115 and the coupled in-car video systems. A user interface ("IU") input/output ("I/O") interface 348 is also coupled to the controller 331 to receive user input and control over application of some rules in the rule set 345 from an external user interface such as administrator interface 132 in FIG. 1.

Server 110 is arranged to interoperate with in-car video systems 151 and 152 (FIG. 2) to balance the uploading of data from the in-car video systems. In one example of dynamic load balancing, server 110 interoperates by performing the illustrative method 400 shown in FIG. 4. The illustrative method 400 starts at block 405.

At block 411, attributes of each client that is operatively connected to an access point (e.g., access point 115 in FIG. 2) are reviewed, typically in a systematic reviewing or "scanning" process where the attributes are viewed and noted by the server 110. Attributes include, for example, characteristics or data that describes or is indicative of an operating state or condition of the in-car system. Thus, the fact that a particular in-car system is being operated by a traffic enforcement officer, for example, who has a high probability of capturing video data having evidentiary value is an attribute that is noted by server 110 during the scanning step 411. Note that the traffic enforcement officer, in this example, is presumed to regularly stop cars (i.e., pull them over) to enforce traffic laws where such traffic stops are routinely recorded by the in-car video system. Such association between the traffic enforcement officer and in-car system may be made, for example, when the officer logs on to use the in-car system in cases where user logins are supported. Alternatively, certain in-car systems (identified by serial number, or a static address like MAC, Media Access Control, or IP, Internet Protocol addresses, for example) or vehicles (identified by radio number, for example) may be included. Accordingly, server 110 can identify and differentiate among individual users, in-car systems, or vehicles by performing the scanning step 411.

In addition to operating states and conditions, attributes may be arranged to include metadata associated with data that is captured and stored by an in-car video system. Metadata is data that describes or otherwise characterizes such stored and captured data and may include, for example, date, time, location, GPS (Global Positioning System) coordinates, user name, vehicle identifier, vehicle speed, status of emergency equipment (e.g., emergency lights or sirens activated), duration of video, duration of audio, or other data which describes or is otherwise associated with the data captured and stored by the in-car system. In this case, server 110 can identify and differentiate among individual data files stored on an in-car video system by performing the scanning step 411 of the metadata in some applications of the invention.

The scanned attributes may be further arranged to include priority status of one or more stored data files. In some in-car systems priority status may be assigned by the user (e.g., police officer) operating the in-car video system. For example, the priority status can be a number ranging from one to five, or one to ten to create five or ten, respectively, discrete priority states. The priorities may be associated with specific event classes (e.g., felony arrest, driving while impaired, citation issued, etc.) or degree of importance (e.g., important, highly important, etc). In some applications, priority status may be considered part of the metadata. In all cases, the server 110 can identify and differentiate among individual data files stored on each in-car system that is operatively coupled to the access point 115 by performing the scanning step 411.

The scanned attributes may be further arranged to include an event type associated with one or more stored data files. In some in-car systems and arrangements, an event may be defined as an "incident" for which the in-car video system was manually turned on by the user (e.g., police officer) to begin recording a scene captured by a video camera mounted in the car, or was automatically activated due to a trigger such as activation of the vehicles' emergency systems (e.g., lights and/or sirens), activation of a speed measuring device (e.g., radar or laser speed unit), or traveling beyond a predetermined speed (e.g., the in-car system is automatically activated to begin recording beyond a threshold vehicle speed such as 65 miles per hour).

A recorded incident may be contrasted to recording of non-incidents which is commonly referred to as "background" recording. Background recording is typically performed at all times that the vehicle containing the in-car video system is in operation (e.g., over the course of an entire shift). Background recording is commonly performed without a manual or automatic activation of the in-car video system. Background recording may be performed at a lower frame rate than is usually used for full motion video, for example on the order of only several frames per second in order to save storage requirements for the background recording but at the expense of video quality (low frame rate video is not generally perceived as smooth and does not, of course, capture all available information presented to the camera). With some in-car video systems, background recording may be changed to incident-type recording at the normal frame recording rate upon a manual or automatic trigger to thereby record an event of interest with normal quality. Thus, the server 110 can identify and differentiate among individual data files that contain incidents and those that contain background recordings by performing the scanning step 411.

The scanning step 411 is performed periodically, i.e., dynamically, over a time interval in order to stay abreast of vehicles and in-car systems (and associated data files and metadata) that come and go into a deployment area (e.g., deployment area 228 in FIG. 2).

Figure 4:
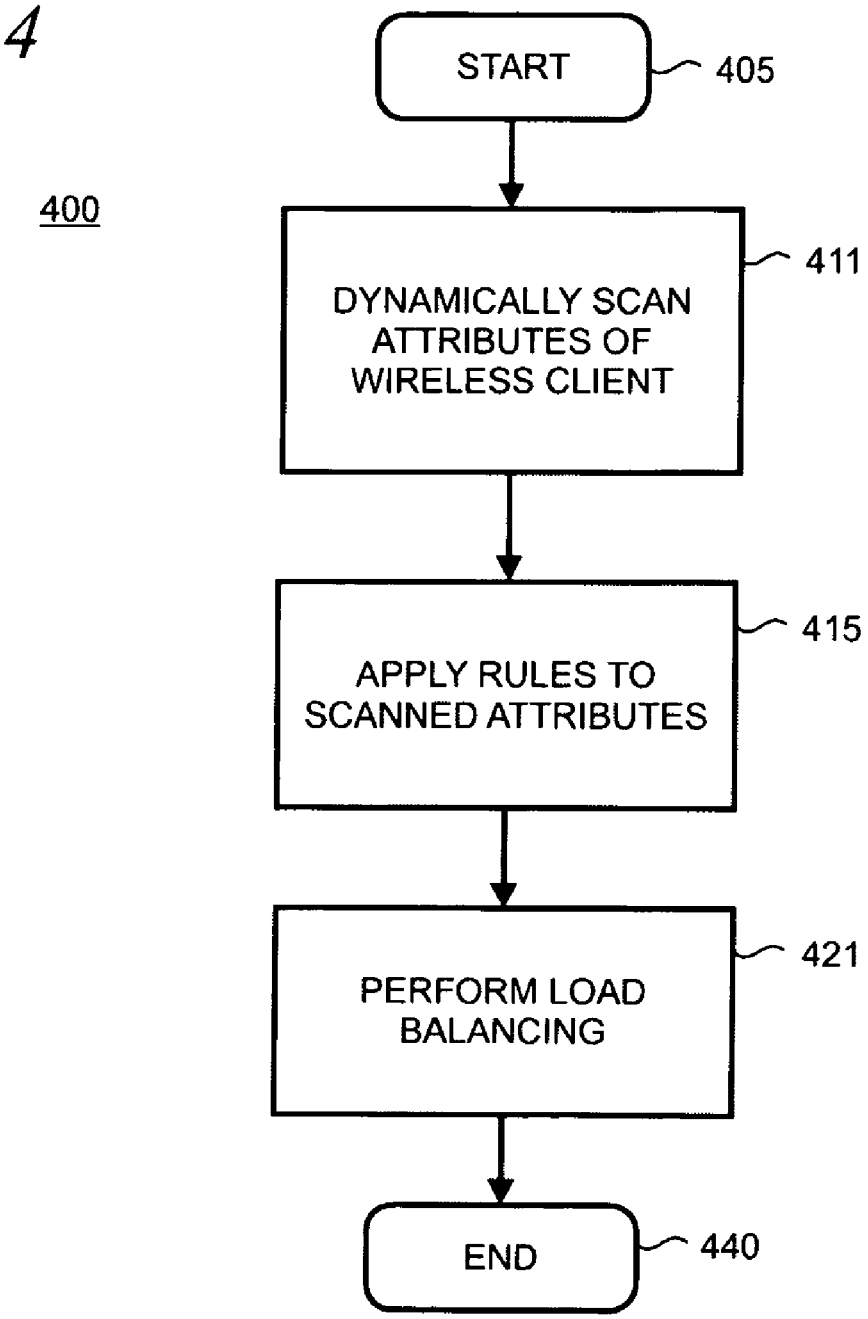
FIG. 4 is a flow chart for an illustrative method of performing dynamic load balancing.

At block 415 in FIG. 4, one or more rules from a rule set (e.g., rule set 345 in FIG. 3) are applied to the scanned attributes. Each of the rules may be selected to perform a particularly desired outcome. For example, it may be desirable to invoke a rule, or a set of rules, that puts a particular in-car video system on hold from starting to transmit, or holding any further transmission, if another in-car system having higher priority is already in, or enters the deployment area. Using the earlier example provided, a traffic enforcement officer's data files associated with recorded traffic stops (which are typically considered incidents) will be given priority by application of one or more rules to the attributes from the officer's in-car video system which identify his in-car system as having high priority. Thus, through the application of the one or more rules an in-car video system associated with a school resource officer (i.e., a police officer who works with faculty and staff inside a school) will have its stored data files held from uploading to the server 110 via the access point 115 until the traffic enforcement officer's data is completely uploaded. Note that for the purposes of this example the school resource officer is presumed to have a lower probability of having captured and stored video with high evidentiary value as compared to the traffic enforcement officer due to the nature of his or her assignment which does not involve regular traffic stops.

Rules in the rule set may also be applied to the scanned attributes that indicate that certain data files have higher priority than other data files. Here, if a first in-car video system in a vehicle is uploading a relatively low priority data file when a second in-car video system in another vehicle having a higher priority data file enters the parking lot, then uploading of the low priority data file is put on hold. The second in-car system is given bandwidth priority so that the higher priority data file can be uploaded first.

As shown by the above examples, the rules in the rule set may be fashioned to provide a variety of load balancing options that allow network administrators and owners to implement a number of ways of balancing bandwidth among network clients. Generally, the available bandwidth from a single access point may be allocated across one or more network clients according to: 1) priority of user, in-car video system or vehicle. For example, functional or organizational differences among in-car video system users may be used to determine which in-car system get bandwidth priority. Thus, a detective is given priority over non-detectives, or a sergeant is given priority over a lower ranking police officer; 2) priority of data file. Here, the most important data files representing the highest probability of having strong evidentiary value are uploaded first before files having lower priority. For example, priority may be determined by the type of event captured (i.e., incident as compared with background recording), or priority may be subjectively defined by an in-car video system user (e.g., using a one to ten scale); 3) other factors including age of stored data file, physical factors such as signal strength of the wireless client, or calculated factors such as those resulting from statistical or other analysis of the scanned attributes, upload history or other data. For example, rules may be fashioned and invoked so that when there are no more recorded incidents to be uploaded, then non-incident background data files are uploaded so that oldest stored files are uploaded first. Bandwidth priority may also be given to in-car video systems that present the best signal strength to the access point. Another example is that bandwidth priority is given to in-car systems or users (e.g., police officers) that have the greatest probability of having data files with evidentiary value where the probability is calculated using statistical or analysis of that in-car system or user's uploading history.

Careful formulation and application of appropriate rules can generally prevent bandwidth monopolization while simultaneously ensuring that data files having high evidentiary value are uploaded first.

At block 421 in FIG. 4, load balancing is performed, in this illustrative example, by issuing commands to the wireless clients from the server 110. The commands are generated responsively to the applied rules so that the appropriate in-car system selects and uploads the appropriate data file (i.e., a "Select and Upload" command). Or a "Hold" command is issued to stop the in-car video system from uploading to ensure that the bandwidth load is optimally shared among the various in-car systems. The illustrative method 400 ends at block 440.

Figure 5:
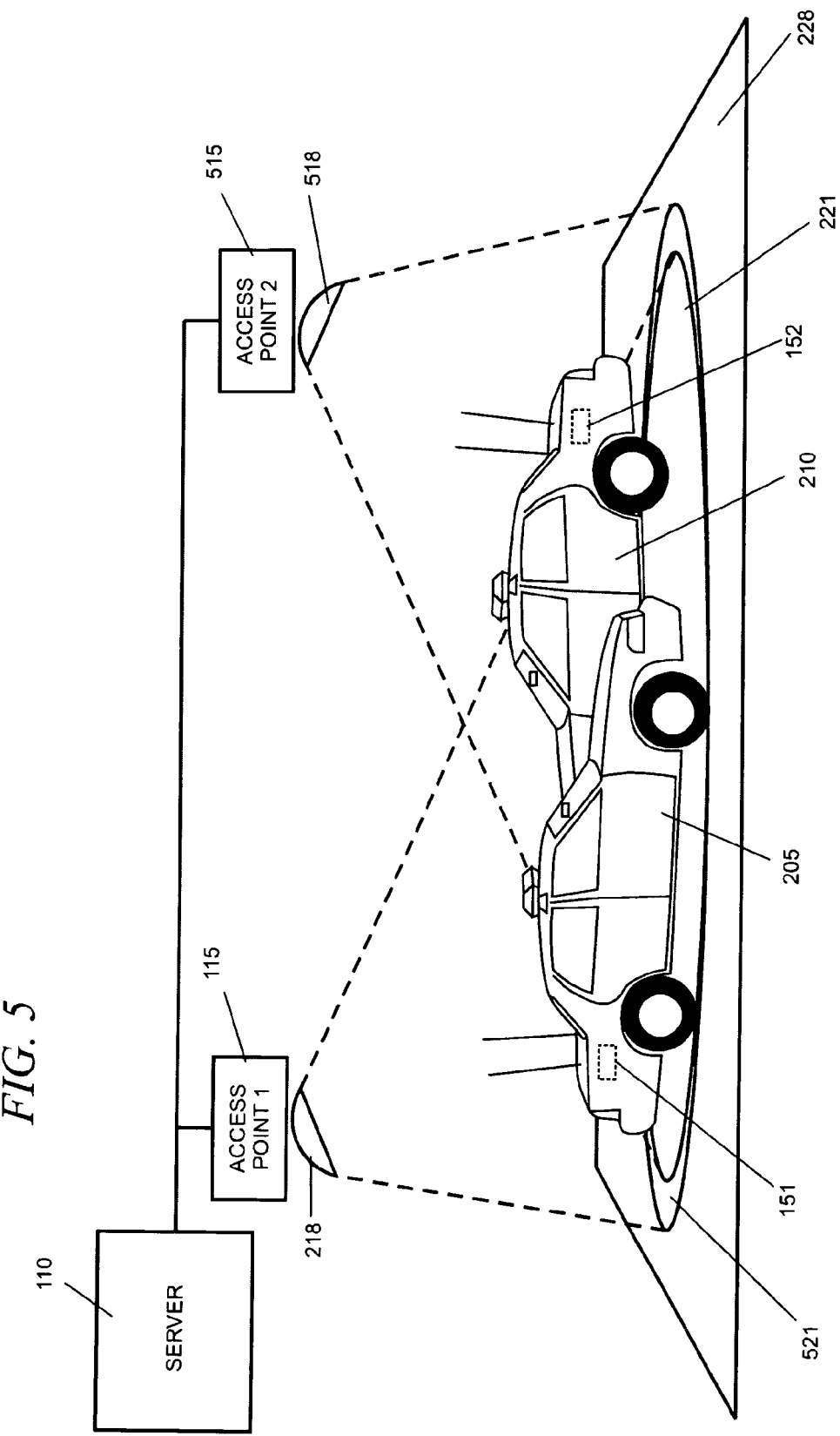
FIG. 5 shows the illustrative dynamic loading network architecture of FIG. 1 as extended with a second access point.

FIG. 5 shows the illustrative dynamic loading network architecture of FIG. 1 as extended with a second access point 515. Access point 515 uses an antenna 518 which is configured to project a zone of coverage 521 in the deployment area 228. Coverage zones 521 and 221 substantially overlap, as shown in FIG. 5 so that in-car video systems 151 and 152 can access either access point 115 or 515.

Access points 115 and 515 are preferably arranged to utilize non-interfering channels. For the IEEE 802.11(b) and (g) specifications define 11 channels that operate in the 2.5 GHz band, but practically only three—channels 1, 6 and 11 can be effectively deployed in close proximity to each other without interference.

Use of two access points having overlapping coverage zones 221 and 521 while employing non-interfering channels enables bandwidth to be balanced between access points as well as between in-car video systems as described above. In addition to providing more degrees of freedom for loading balancing, additional access points can remove bandwidth bottlenecks and provide greater total network throughput from the in-car video system 151 and 152 to server 110.

A similar method as shown in FIG. 4 and described in the accompanying text is used for load balancing across multiple access points. However, the actions taken by the server 110 and commands issued are more broadly defined to take advantage of the additional functionality offered by the two access points with overlapping coverage. For example, in addition to the hold and upload selected data file commands, the server 110 can issue a command to instruct the in-car video system to switch channels to thereby roam from a first to a second access point. In some applications of the invention, it may be desirable for the server 110 to force an in-car video system to switch from the first to the second access point by refusing to acknowledge an uploaded frame. The lack of acknowledgement has a similar effect as an affirmative command in that the wireless client in the in-car video system will attempt to locate another access point on a different channel after several attempts to transmit a frame without receiving an acknowledgement.

Figure 6:
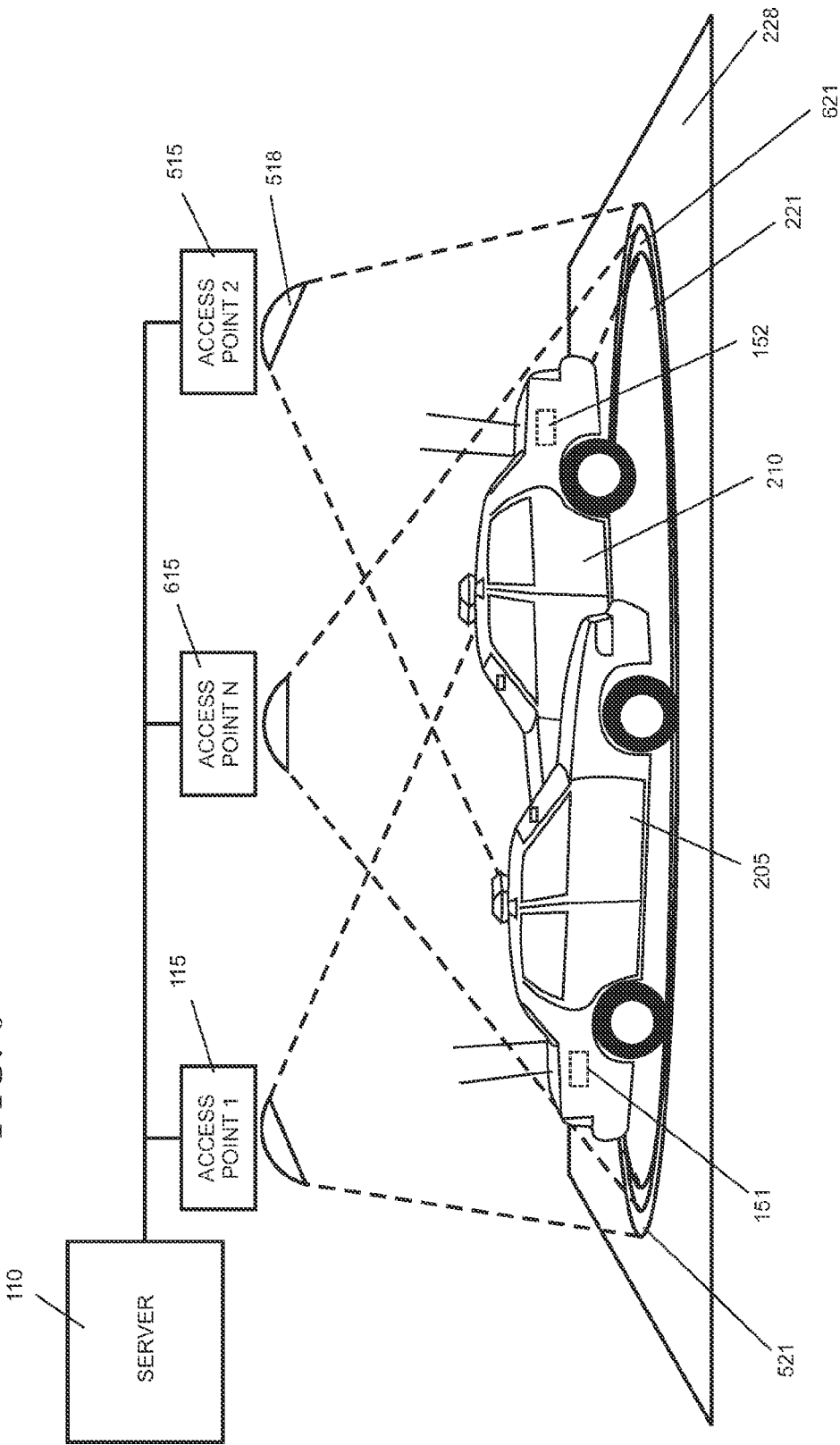
FIG. 6 shows the illustrative dynamic load balancing network architecture of FIG. 5 as extended with an Nth access point.

While FIG. 5 shows overlapping access point coverage with two access points, FIG. 6 shows the illustrative dynamic loading network architecture of FIG. 5 as extended with an Nth access point 615. As noted above, N can typically equal three due to the limited availability of non-interfering channels generally. However, the use of highly directional antennas and other techniques may allow N to be greater than three in some applications. As shown in FIG. 6, three substantially overlapping coverage zones 221, 521 and 621 enable the server 110 to issue commands or take actions to have in-car video systems switch between three access points. In addition to the potential overall throughput enabled by the Nth access point 615, more flexibility in load balancing across the N access points is achieved.

Figure 7:
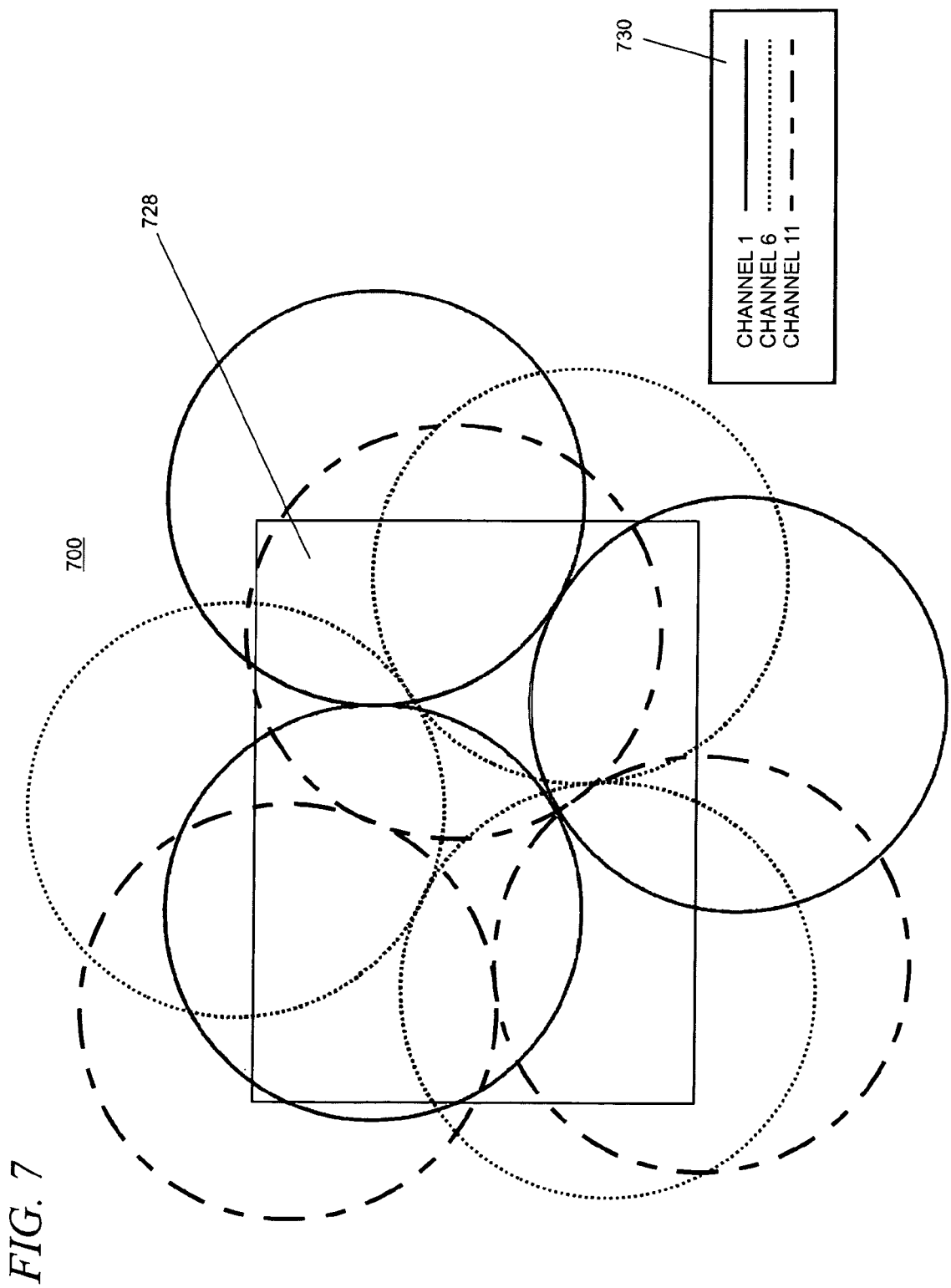
FIG. 7 shows a wireless network footprint using a plurality of access points reusing non-interfering channels.

FIG. 7 shows an illustrative wireless network footprint 700 using a plurality of access points which reuse non-interfering channels that provide overlapping coverage over a deployment area 728 such as a parking lot or parking garage. In this illustrative example, circular zones of coverage are implanted using the three non-interfering 802.11 channels 1, 6, and 11 as indicated by the legend 730. A plurality of access points are physically deployed so that every location in the deployment area is covered by at least two non-interfering channels with relatively similar signal strengths. It is emphasized that the network footprint 700 is merely illustrative as similar results may be obtained using different deployment patterns and a different number of access points. In addition, actual deployed results can be significantly affected by the particular factors and circumstances (e.g., topology, elevation, presence of buildings, presence of interference sources etc.) in a specific application of the invention.

Figure 8:
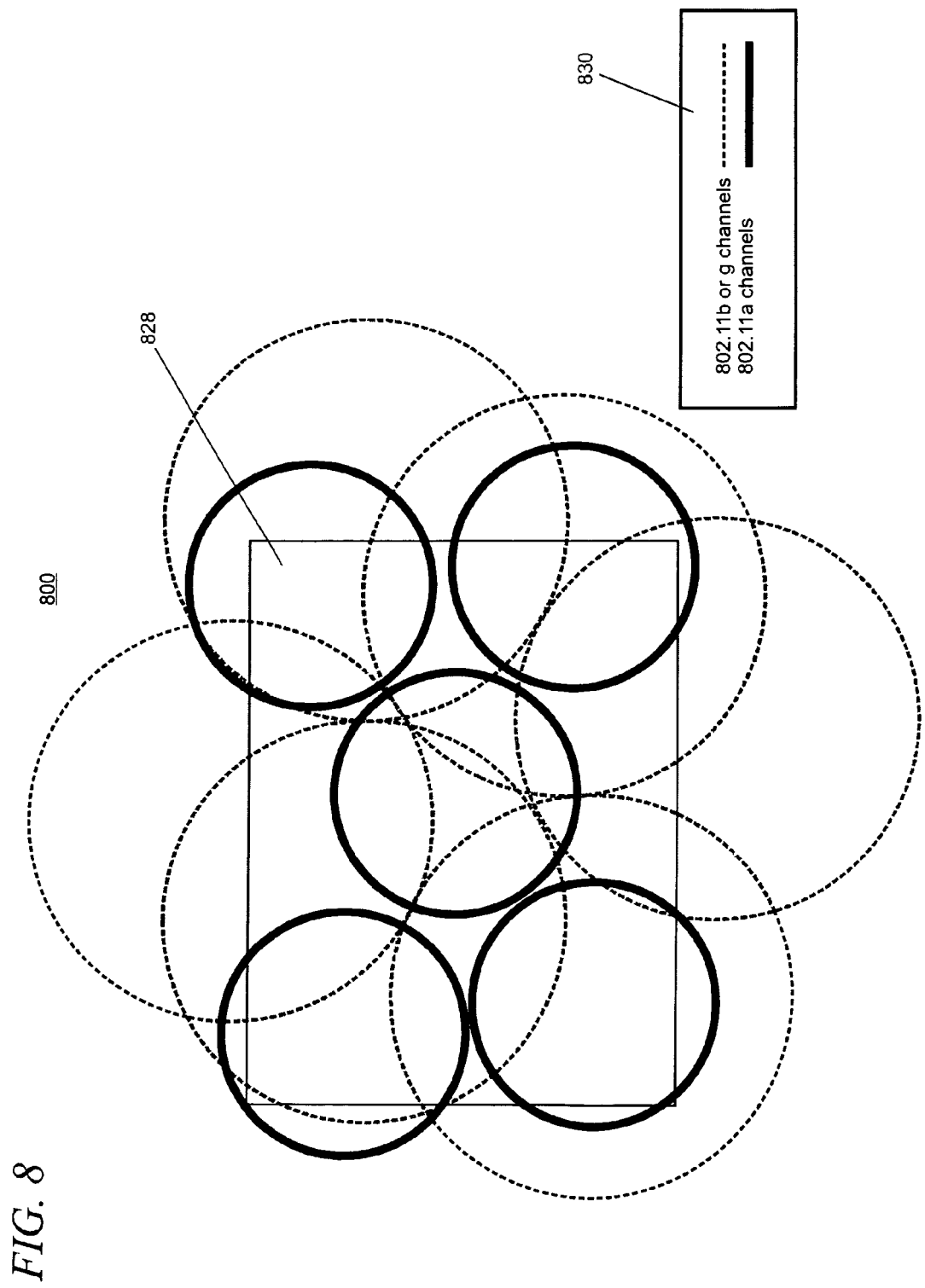
FIG. 8 shows a wireless network footprint using a plurality of access points reusing non-interfering long range channels and non-interfering short range channels.

FIG. 8 shows a wireless network footprint 800 using a plurality of access points reusing non-interfering long range channels and non-interfering short range channels that provide overlapping coverage over a deployment area 828 such as a parking lot or parking garage. In this illustrative example, the long range channels are IEEE 802.11(b) or (g) channels and the short range channels are IEEE 802.11(a) channels. Since the long range channels operate in the 2.4 GHz band and the short range channels operate in the 5 GHz band, additional flexibility is afforded by more non-interfering channels. As indicated by the legend 830, the short range channels are positioned in the interstices formed by the overlapping long range channels.

The preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of the present invention is embodied by the appended claims.

What is claimed is:

1. A method for load balancing traffic between a server and a plurality of in-car video systems over a communications network, the method comprising the steps of:
maintaining a profile for an in-car video system that accesses the communications network for uploading data to the server disposed on the communications network, the maintaining including scanning metadata associated with each of one or more individual data files stored in a data store that is operatively coupled to the in-car video system, the metadata including at least two of GPS coordinates, user name, vehicle identifier, vehicle priority identifier, in-car video system identifier, data file priority, vehicle speed, or status of emergency equipment;
applying one or more rules from a load balancing rule set to the profile; and
sending an executable command to the in-car video system if the profile meets the one or more rules in the load balancing rule set, the command instructing the in-car video system to differentiate among the individual data files stored in the in-car video system for prioritized uploading to the server.

2. The method of claim 1 in which the maintaining is performed dynamically to thereby track changes in the profile for the in-car video system over a time interval.

3. The method of claim 1 in which the data store is disposed in a video recording device.

4. The method of claim 3 in which the video recording device is one of VCR or DVR.

5. The method of claim 1 in which the one or more rules include at least one rule that instructs the in-car video system to upload a highest priority data file before uploading other data files.

6. The method of claim 1 in which the one or more rules include at least one rule that commands the in-car video system to upload a data file only if no in-car video systems with higher priority are accessing the access point.

7. The method of claim 1 in which the one or more rules include at least one rule that commands the in-car video system to upload a data file associated with an incident before uploading a data file associated with background recording.

8. The method of claim 1 in which the one or more rules include at least one rule that commands the wireless client to upload an oldest data file before uploading other data files.

9. The method of claim 1 in which the implementing comprises switching transmitting frequency to thereby upload to a second wireless access point.

10. The method of claim 1 in which the implementing comprises holding uploading until a command is received to begin uploading or resume uploading.

11. A hardware-based server arranged for use in a communications network that includes a wireless access point, comprising:
a controller;
an interface couplable to the wireless access point that is accessible by a wireless client disposed in an in-car video system for receiving data from the in-car video system, the received data comprising metadata which includes at least two of GPS coordinates, user name, vehicle identifier, vehicle priority identifier, in-car video system identifier, data file priority, vehicle speed, or status of emergency equipment; and
a non-transitory program store containing programming instructions that are executed by the controller to implement a rules engine for generating a load balancing command to the in-car video system responsively to the received data from the wireless client, the command instructing the in-car video system to differentiate among individual data files stored in the in-car video system for prioritized uploading to the hardware-based server, the differentiation utilizing the metadata.

12. The hardware-based server of claim 11 further including a user interface for facilitating interaction with the rules engine to thereby enable user-selection of one or more rules that are used to generate the load balancing command.

13. The hardware-based server of claim 11 in which the programming instructions are further arranged to implement a scanning functionality that, when executed by the controller, performs scanning of metadata associated with data files stored on the in-car video system, the scanned metadata being included in the received data from the in-car video system.

14. A non-transitory computer-readable medium containing instructions which, when executed by one or more processors disposed in an electronic device, perform a method comprising the steps of:
dynamically scanning attributes of each of a plurality of in-car video systems that are in-range of a local area network including one or more access points, the scanned attributes comprising metadata which includes at least two of GPS coordinates, user name, vehicle identifier, vehicle priority identifier, in-car video system identifier, data file priority, vehicle speed, or status of emergency equipment; and
load balancing data from each of the plurality of in-car video systems according to a set of rules that are applied to the attributes, the load balancing comprising establishing priority of one of an in-car video system, a user of the in-car video system, or a file stored on the in-car video system when accessing the local area network to upload evidentiary data captured by the in-car video system and issuing an executable command to instruct the in-car video system to differentiate among individual data files stored in the in-car video system for uploading responsively to the established priority.

15. The non-transitory computer-readable medium of claim 14 in which the attributes include identities of the in-car video systems.

16. The non-transitory computer-readable medium of claim 14 in which the attributes include data related to video evidence captured and stored by an in-car video system.

17. The non-transitory computer-readable medium of claim 16 in which the data is metadata.

18. The non-transitory computer-readable medium of claim 17 in which the metadata is selected from one of date, time, location, GPS coordinates, user name, vehicle identifier, vehicle speed, status of emergency equipment, duration of video, duration of audio, or other data which describes or is otherwise associated with the video evidence.

19. The non-transitory computer-readable medium of claim 14 in which the load balancing comprises selecting an in-car video system to roam from a first access point to a second access point.

20. The non-transitory computer-readable medium of claim 19 in which the roaming is implemented by sending a command to instruct the in-car video system to switch from a first wireless communication channel to a second wireless communication channel.

21. The non-transitory computer-readable medium of claim 19 in which the roaming is forced by refraining from acknowledging a data frame received from an in-car video system.

22. The non-transitory computer-readable medium of claim 14 in which the set of rules invokes a method for load balancing by first downloading data files that are designated with higher priority before downloading data files designated with lower priority.

23. The non-transitory computer-readable medium of claim 22 in which data files are designated with a priority through use of a user interface operatively coupled to an in-car video system.

24. The non-transitory computer-readable medium of claim 14 in which the set of rules invokes a method for load balancing by first downloading data files from an in-car video system having higher priority before downloading data files from another in car video system having lower priority.

25. The non-transitory computer-readable medium of claim 14 in which the set of rules invokes a method for load balancing by first downloading data files having an earlier recording time before downloading data files having a later recording time.

26. The non-transitory computer-readable medium of claim 14 in which the set of rules invokes a method for load balancing by first downloading data files having higher evidentiary value before downloading data files having a lower evidentiary value.

27. The non-transitory computer-readable medium of claim 14 in which the set of rules invokes a method for load balancing by first downloading data files representing recorded incidents before downloading data files representing background recording.

28. An in-car video system that is mountable in a vehicle, comprising:

A hardware-based video recorder for recording video captured by a camera disposed in the vehicle;

a wireless network interface arranged to link to a wireless access point in a communications network so that at least recorded video is transferable to a server coupled to the communications network; and a non-transitory medium on which computer code is stored, the computer code comprising a) a first code set for receiving, over the wireless network interface, a command from the server providing transmitting instructions to the in-car video system, the command instructing the in-car video system to differentiate among individual data files stored in the in-car video system for uploading according to a priority established by the server, the differentiation utilizing metadata that includes at least two of GPS coordinates, user name, vehicle identifier, vehicle priority identifier, in-car video system identifier, data file priority, vehicle speed, or status of emergency equipment, and b) a second code set for transmitting the at least recorded video to the wireless access point according to the transmitting instructions.

29. The in-car video system of claim 28 in which the transmitting the at least recorded video is performed in accordance with IEEE 802.11.

30. The in-car video system of claim 28 in which the transmitting the at least recorded video is performed in accordance with one of IEEE 802.11(a), IEEE 802.11(b) or IEEE 802.11(g).

31. A method for deploying a plurality of access points in a communications network, each access point in the plurality being arranged to communicate with one or more in-car video systems over a plurality of channels, the method comprising the steps of:

arranging at least two access points so that at least two non-interfering channels are available within a deployment area that is accessible by the one or more in-car video systems; and load balancing data uploaded from the one or more in-car video systems by controlling the uploading across the at least two access points, the controlling comprising sending an executable command to the one or more in-car video systems to instruct the in-car video systems to differentiate among individual data files stored in the in-car video system for uploading according to a priority established by a server that is operatively coupled to the at least two access points, the differentiation utilizing metadata that includes at least two of GPS coordinates, user name, vehicle identifier, vehicle priority identifier, in-car video system identifier, data file priority, vehicle speed, or status of emergency equipment.

32. The method of claim 31 in which the at least two access points communicate over channels that are compliant with IEEE 802.11(g).

33. The method of claim 31 in which the at least two access points communicate over channels that are compliant with IEEE 802.11(b).

34. The method of claim 31 in which a first one of the at least two access points communicates over a channel that is compliant with IEEE 802.11(b) or IEEE 802.11(g) and a second of the at least two access points communicates over a channel that is compliant with IEEE 802.1 1 (a).

35. The method of claim 31 in which the deployment area is a parking facility, the parking facility being selected from one of parking lot or parking garage.

* * * * *

UNITED STATES PATENT AND TRADEMARK OFFICE
CERTIFICATE OF CORRECTION

PATENT NO.         : 8,363,102 B1                                   Page 1 of 1
APPLICATION NO.    : 11/581228
DATED              : January 29, 2013
INVENTOR(S)        : Christopher Allen Kadoch and Kurt A. Kessel It is certified that error appears in the above-identified patent and that said Letters Patent is hereby corrected as shown below:

Title page, item (54) and in the Specification, Col. 1, after "BALANCING" change "DATE" to --DATA--.

Signed and Sealed this
Ninth Day of April, 2013

Teresa Stanek Rea
*Acting Director of the United States Patent and Trademark Office*